US012629707B2

(12) United States Patent
Ketterling

(10) Patent No.: US 12,629,707 B2
(45) **Date of Patent: *May 19, 2026**

(54) ROTARY SPRINKLER RISER EXTENSION KIT

(71) Applicant: Kody J. Ketterling, Twin Falls, ID (US)

(72) Inventor: Kody J. Ketterling, Twin Falls, ID (US)

( * ) Notice: Subject to any disclaimer, the term of this patent is extended or adjusted under 35 U.S.C. 154(b) by 433 days.

This patent is subject to a terminal disclaimer.

(21) Appl. No.: 18/528,757

(22) Filed: Dec. 4, 2023

(65) Prior Publication Data

US 2024/0100547 A1 Mar. 28, 2024

Related U.S. Application Data

(63) Continuation of application No. 17/982,373, filed on Nov. 7, 2022, now Pat. No. 11,833,538, which is a (Continued)

(51) Int. Cl.
*B05B 3/04* (2006.01)
*B05B 15/74* (2018.01)

(52) U.S. Cl.
CPC ............ *B05B 3/0417* (2025.08); *B05B 15/74* (2018.02)

(58) Field of Classification Search
CPC ..... B05B 3/0417; B05B 15/74; B05B 3/0422; B05B 15/656; B05B 1/267; B05B 15/658; B05B 15/52; B05B 15/628
See application file for complete search history.

(56) References Cited

U.S. PATENT DOCUMENTS

| | | | |
|---|---|---|---|
| D132,183 | S | 4/1942 | Lewis |
| D221,651 | S | 8/1971 | Napper |

(Continued)

FOREIGN PATENT DOCUMENTS

| | | |
|---|---|---|
| JP | 1447235 | 6/2012 |

OTHER PUBLICATIONS

Amazon ("231 Irrigator-Pro 6.5-Inch Universal Sprinkler SPRAY Riser Extension"). https://www.amazon.com/dp/B07491V94Y/ref=sspa_dk_detail_7?psc=1&pd_rd_i=B07491V94Y&pd_rd_wg=554kv&pd_rd_r=3CZ97A2SA62QZPPFVCPF&pd_rd_w=pZvHF. Apr. 28, 2018.

(Continued)

*Primary Examiner* — Steven M Cernoch
(74) *Attorney, Agent, or Firm* — Burdick Patents, P.A.; Sean D. Burdick; Colin L. Honan

(57) ABSTRACT

A rotary sprinkler riser extension kit is disclosed for use with a rotary sprinkler. The kit includes an external riser extension having an upper end and lower end, and defining a channel extending through the upper end and lower end. The channel is configured to accommodate the stem of the rotary sprinkler, the upper end is configured to attach to the cap of the rotary sprinkler, and the lower end is configured to attach to the enclosure of the rotary sprinkler. The kit also includes an internal riser extension having a height substantially equal to total length of the external riser extension, a width less than inner width of the enclosure of the rotary sprinkler, means for attaching to the geared lower end of the stem, a lower gear configured to rotate the rotary sprinkler, and means to raise the stem and channel water thereto in response to water pressure at an inlet to the enclosure.

20 Claims, 5 Drawing Sheets

Related U.S. Application Data continuation of application No. 16/748,769, filed on Jan. 21, 2020, now Pat. No. 11,491,499.

(60) Provisional application No. 62/794,911, filed on Jan. 21, 2019.

(56) References Cited

U.S. PATENT DOCUMENTS

| | | | |
|---|---|---|---|
| 3,733,030 | A | 5/1973 | Carstenson |
| 4,018,386 | A | 4/1977 | Barichello |
| 4,220,283 | A | 9/1980 | Citron |
| 4,919,332 | A | 4/1990 | Bailey |
| 5,133,501 | A | 7/1992 | Marshall |
| D349,758 | S | 8/1994 | Hallbach et al. |
| 5,335,857 | A | 8/1994 | Hagon |
| 5,918,812 | A | 7/1999 | Beutler |
| 6,000,632 | A | 12/1999 | Wallace |
| 6,050,500 | A | 4/2000 | Ensworth |
| 6,138,924 | A | 10/2000 | Hunter et al. |
| 6,193,168 | B1 | 2/2001 | Bedford |
| 6,478,237 | B2 | 11/2002 | Kearby et al. |
| 6,502,764 | B2 | 1/2003 | Walker |
| 6,629,648 | B1 | 10/2003 | Jones |
| 6,648,241 | B1 | 11/2003 | Doshay |
| 6,874,696 | B1 | 4/2005 | Ericksen et al. |
| 7,686,236 | B2 | 3/2010 | Alexander |
| 7,832,659 | B1 | 11/2010 | Collins |
| 8,272,578 | B1 | 9/2012 | Clark et al. |
| 8,430,339 | B2 | 4/2013 | Stewart et al. |
| D699,321 | S | 2/2014 | Karihara et al. |
| 9,192,956 | B2 | 11/2015 | Kah et al. |
| 9,481,003 | B2 | 11/2016 | Clark et al. |
| 9,539,602 | B2 | 1/2017 | Wright et al. |
| D783,133 | S | 4/2017 | Fitzhugh et al. |
| 9,699,974 | B2 | 7/2017 | Clark et al. |
| 9,765,913 | B2 | 9/2017 | Magargal et al. |
| D932,597 | S | 10/2021 | Cheng |
| D960,308 | S | 8/2022 | Ketterling |
| D972,079 | S | 12/2022 | Chiba et al. |
| D984,597 | S | 4/2023 | Wang |
| D992,687 | S | 7/2023 | Tempel |
| D1,000,585 | S | 10/2023 | Koiwa |
| D1,023,232 | S | 4/2024 | Horoba |
| D1,023,234 | S | 4/2024 | Stein |
| D1,029,183 | S | 5/2024 | Horoba et al. |
| D1,037,409 | S | 7/2024 | Stein et al. |
| D1,082,570 | S | 7/2025 | Ouchi |
| D1,085,030 | S | 7/2025 | Brouwer |
| 2003/0042327 | A1 | 3/2003 | Beutler et al. |
| 2005/0194464 | A1 | 9/2005 | Bruninga |
| 2011/0259977 | A1 | 10/2011 | Lo |
| 2016/0175858 | A1 | 6/2016 | Bell et al. |
| 2018/0002645 | A1 | 1/2018 | Bartley et al. |
| 2018/0141060 | A1 | 5/2018 | Walker et al. |
| 2020/0230626 | A1 | 7/2020 | Ketterling |

OTHER PUBLICATIONS

Amazon: https://www.amazon.com/10-Pack-Cut-off-Sprinkler-Extension/dp/B00LORBMU0. Apr. 28, 2018.

https://www.doityourself.com/stry/3-sprinkler-riser-types. Apr. 28, 2018.

https://www.irrigationtutorials.com/sprinkler-head-risers/. Apr. 28, 2018.

Installing Risers & Sprinkler Heads: https://www.hometips.com/diy-how-to/sprinkler-heads-risers-installing.html . Apr. 28, 2018.

International Preliminary Report on Patentability and Written Opinion mailed Jun. 16, 2020 for corresponding PCT/US2020/014490.

International Preliminary Report on Patentability mailed Jul. 29, 2021 for PCT/US2020/014490.

Sprinkler Fittings: https://www.hometips.com/buying-guides/sprinkler-pipes-fittings.html. Apr. 28, 2018.

Sprinkler Lift product: https://www.sprinklerlift.com. Apr. 28, 2018.

Sprinkler System Store: http://www.sprinklersystemstore.com/sprinkler-systems-sprinkler-system-parts/sprinkler-risers/?sort=alphaasc&page=3. Apr. 28, 2018.

Sprinkler Warehouse: http://www.sprinklerwarehouse.com/Shrub-Sticks-Risers-s/225.htm. Apr. 28, 2018.

Sprinkler Warehouse: https://www.sprinklerwarehouse.com/Riser-Extension-p/37056.htm. Apr. 28, 2018.

SECTION B-B

ROTARY SPRINKLER RISER EXTENSION KIT

RELATED APPLICATIONS

This application is a continuation of and claims priority to U.S. patent application Ser. No. 17/982,373 filed Nov. 7, 2022, which is a continuation of and claims priority to U.S. patent application Ser. No. 16/748,769 filed Jan. 21, 2020, which is a continuation-in-part of and claims priority to U.S. Provisional Application 62/794,911 filed Jan. 21, 2019, all of which are fully incorporated herein by reference.

BACKGROUND OF THE INVENTION

Field of the Invention

The present invention relates generally to irrigation systems, and more particularly to a retrofit riser kit for rotary lawn sprinklers.

Description of Related Art

Heads for popup sprinklers in irrigation systems, particularly those installed in lawns and gardens, become buried over time due to soil build-up and grass growth in the immediate vicinity of the sprinkler head. This causes blockage of the popup action or blockage of water flow, rendering the sprinkler unable to provide desired irrigation coverage.

A conventional solution is to dig away the grass and dirt around the sprinkler head, then remove the sprinkler head from its riser (usually made of PVC), and add length to the riser by cutting and cementing a internal riser extension in place. After the cement cures, the sprinkler head can then be reinstalled to the riser extension at a higher elevation above the lawn.

The conventional solution, however, is labor intensive and time consuming, and also risks introducing dirt and other debris into the sprinkler line that can clog sprinkler heads and cause further problems later on. Other solutions involve installing risers internal to the sprinkler head mechanism, but these are also time consuming because they require that the sprinkler cap be removed and its internal mechanism reconstructed. Those solutions are also structurally specific to a particular make and model of sprinkler head.

What is needed is a universal riser that fits multiple makes and models of rotary sprinkler heads, that is easy to install, and that doesn't require digging up the sprinkler or cutting and cementing irrigation lines.

SUMMARY OF THE INVENTION

The foregoing problems are overcome by a rotary sprinkler riser extension kit according to the present invention. In one embodiment, the extension kit consists of two cooperating parts: an external riser extension and an internal riser extension.

The external riser extension is generally cylindrical and configured to attach between the cap of a rotary sprinkler and its enclosure. The external riser extension defines a vertical cylindrical channel running centrally through its upper end and lower end and concentrically aligned with a rotational axis of the rotary sprinkler. The cylindrical channel has an internal diameter that accommodates the width of the stem and spring of the rotary sprinkler, and has a height substantially equal to the length of the internal riser extension. The lower end of the external riser extension is configured to attach to the enclosure of the rotary sprinkler. In one embodiment, the external riser extension comprises a cylindrical conduit which may be threaded at both ends. For example, the external riser extension may be configured with male threading at its upper end configured to engage female threading of the cap of the rotary sprinkler, and with female threading at its lower end configured to engage the enclosure of the rotary sprinkler.

The internal riser extension is generally cylindrical, and is sized to fit within the enclosure of the rotary sprinkler and attach to the bottom of the internal stem. The internal riser extension has a height substantially identical to the height of the external riser extension. Thus, when the internal riser extension is attached to the stem of the rotary sprinkler, the sprinkler head is raised by an amount equal to the height that the external riser extension adds to the height of the enclosure, to ensure proper fit. The end result is a rise in the overall height of the rotary sprinkler, with no leakage.

The internal riser extension comprises a body, preferably generally cylindrical, that defines a channel running centrally through its upper end and lower end and concentrically aligned with a rotational axis of the rotary sprinkler. The internal riser extension includes a means for attaching to the bottom of the rotary sprinkler stem, a lower gear attached to the lower end, and a means for arresting rotation of the sprinkler head. The means for attaching to the bottom of the rotary sprinkler is attached to the top of the riser body, the lower gear is attached to, or formed onto, the bottom of the riser body. The lower gear is configured similarly to the rotary gear of the rotary sprinkler, such that when the riser extension kit is installed and the rotary gear vertically displaced from its operable position, the lower gear assumes the prior position and function of the rotary gear. The body of the internal riser extension has an external width or diameter less than the inner width or diameter of the enclosure of the rotary sprinkler, so that the internal riser extension can fit within the enclosure without causing undue interference during sprinkler operation. The internal riser extension is configured with one or more through-holes to channel water therethrough, and to raise the stem of the rotary sprinkler and deliver water to the sprinkler head when sufficient water pressure occurs at an inlet to the sprinkler enclosure.

The means for attaching to the bottom of the rotary sprinkler may include gear engagement tabs configured to engage a geared end of a stem of a rotary sprinkler. The gear engagement tabs may be concentrically arranged and spaced apart to attach to and engage by friction-fit the teeth of the geared end of the rotary sprinkler.

To install a rotary sprinkler riser kit according to the invention, a sprinkler technician removes the cap from an existing rotary sprinkler and withdraws the stem from the enclosure. The internal riser extension is then manually attached, e.g. by snap-fit or friction-fit, to the bottom of the stem by attachment to one or both of the rotary gear and to the interior part of the stem of the rotary sprinkler. The stem of the rotary sprinkler is then passed through the external riser extension, and the external riser extension is then attached, e.g. by threading, to the cap. The assembled cap and stem are then re-inserted into the enclosure and the assembly is attached to the enclosure by threading the lower end of the external riser extension to the enclosure, to complete the installation and effectively extend the elevation of the rotary sprinkler head according to the length of the external and internal riser extensions.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

A rotary sprinkler riser extension kit according to the present invention consists of two cooperating parts: an external riser extension and an internal riser extension. The kit is designed for installation to an existing, or conventional, rotary pop-up sprinkler. Use of the rotary sprinkler riser extension kit allows a user to raise the height of a conventional rotary pop-up sprinkler without having to dig out the sprinkler, and without having to splice-and-glue a riser extension to the sprinkler line. When properly installed, the rotary sprinkler riser extension preserves the pop-up and rotational functionality of the conventional sprinkler while allowing the sprinkler to discharge water at a raised elevation.

Figure 1:
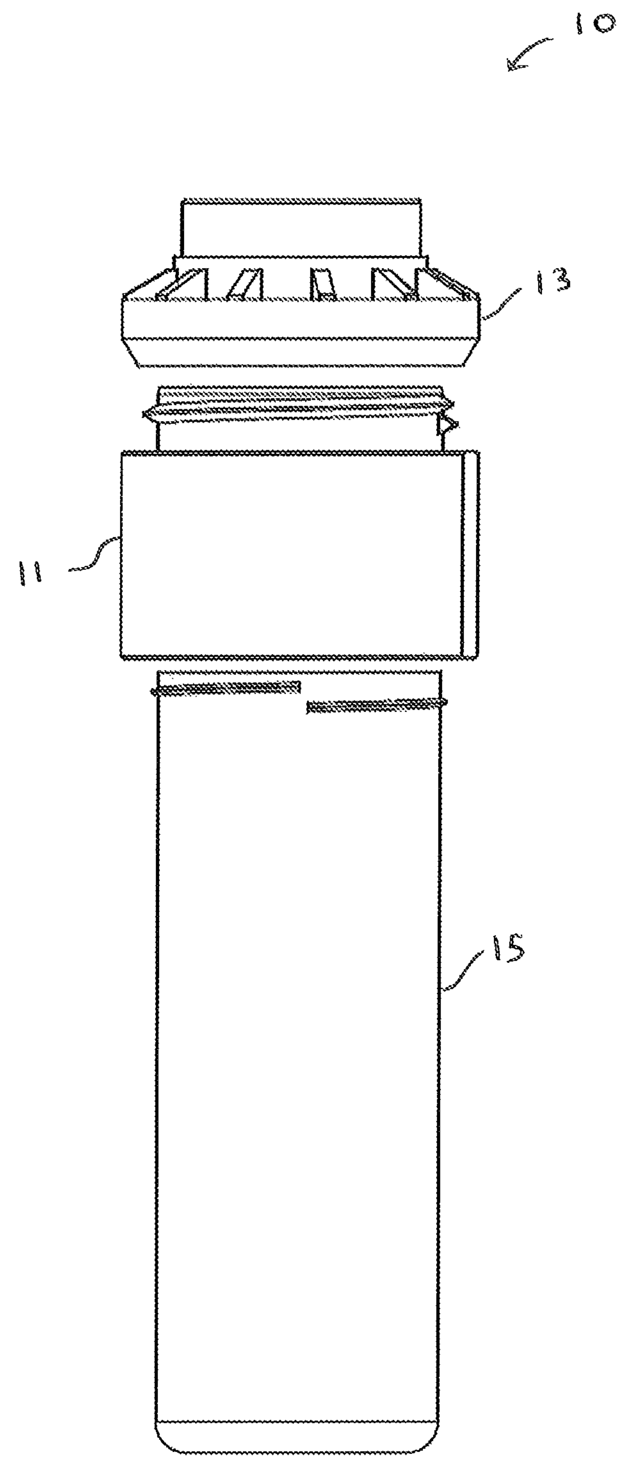
FIG. 1 is an exploded view of an assembly that illustrates how one embodiment of an external riser extension of the present invention fits between a cap and enclosure of a conventional rotary pop-up sprinkler.
Figure 2:
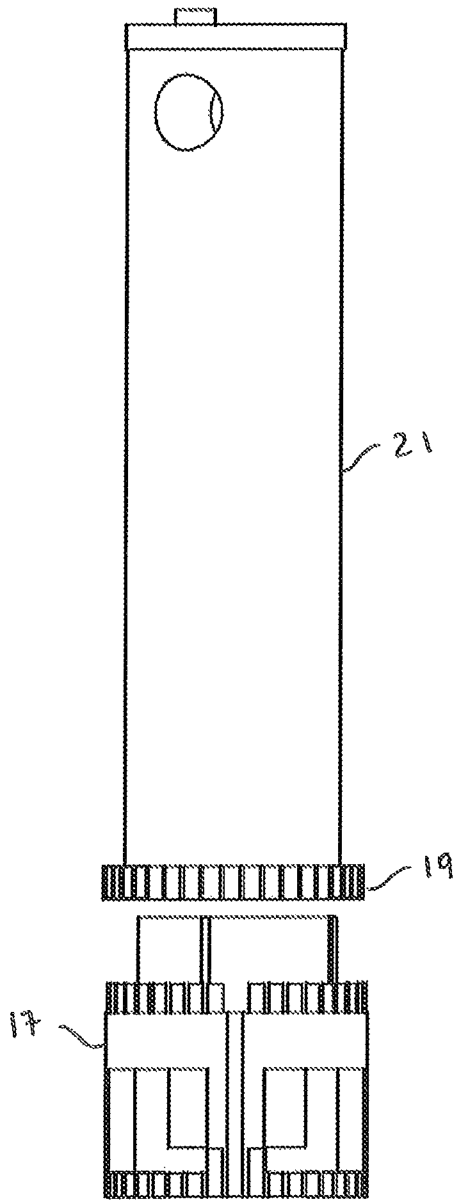
FIG. 2 is an exploded view showing how one embodiment of an internal riser extension of the present invention fits to a bottom end of a stem of a conventional rotary pop-up sprinkler.

FIGS. 1 and 2 show an exploded view of an assembly 10 that includes an embodiment of an external riser extension kit of the present invention. FIG. 1 illustrates how an external riser extension 11 according to the invention fits between a cap 13 and an enclosure 15 of a conventional rotary pop-up sprinkler. The external riser extension 11 is configured to raise the height of the rotary sprinkler while maintaining the functional properties of the rotary sprinkler and without allowing leakage of water out of the cap 13 or enclosure 15.

FIG. 2 shows components internal to assembly 10, and illustrates how an embodiment of an internal riser extension 17 of the present invention fits to a geared bottom end 19 of a stem 21 of a conventional rotary pop-up sprinkler. For clarity, it is noted that a rotary sprinkler riser extension kit according to the present invention may include only the external riser extension 11 and the internal riser extension 17; while a conventional rotary pop-up sprinkler may consist of the cap 13, the enclosure 15, and the stem 21.

Figure 3:
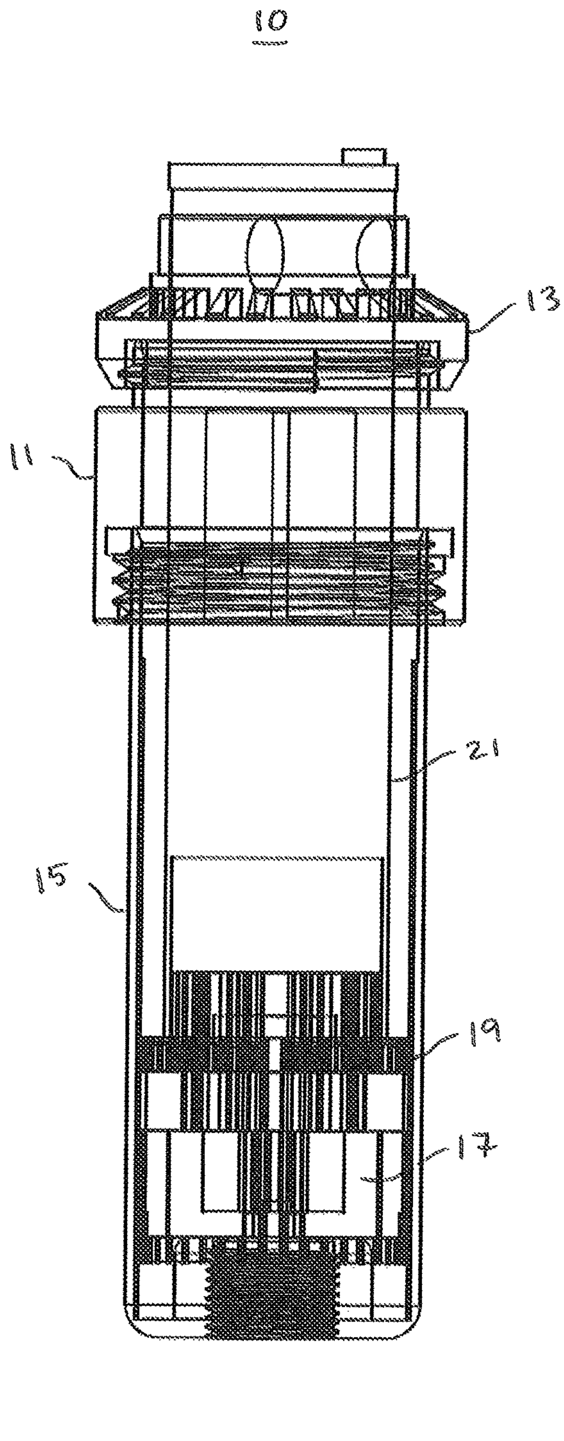
FIG. 3 is a transparent view that shows, in superposition, an external riser extension and internal riser extension of the present invention installed to a conventional rotary sprinkler that is fully collapsed.

FIG. 3 provides a transparent view that shows, in superposition, an external riser extension 11 and internal riser extension 17 of the present invention installed to a conventional rotary sprinkler that is fully collapsed to an inactive position. In this state, the internal riser extension 17 and the stem 21 are substantially contained within the enclosure 15 of the conventional sprinkler. When assembly 10 is in the inactive position, water pressure is nonexistent, or insufficient to force stem 21 outward beyond cap 13 to an operating (e.g. sprinkling) position.

Figure 4:
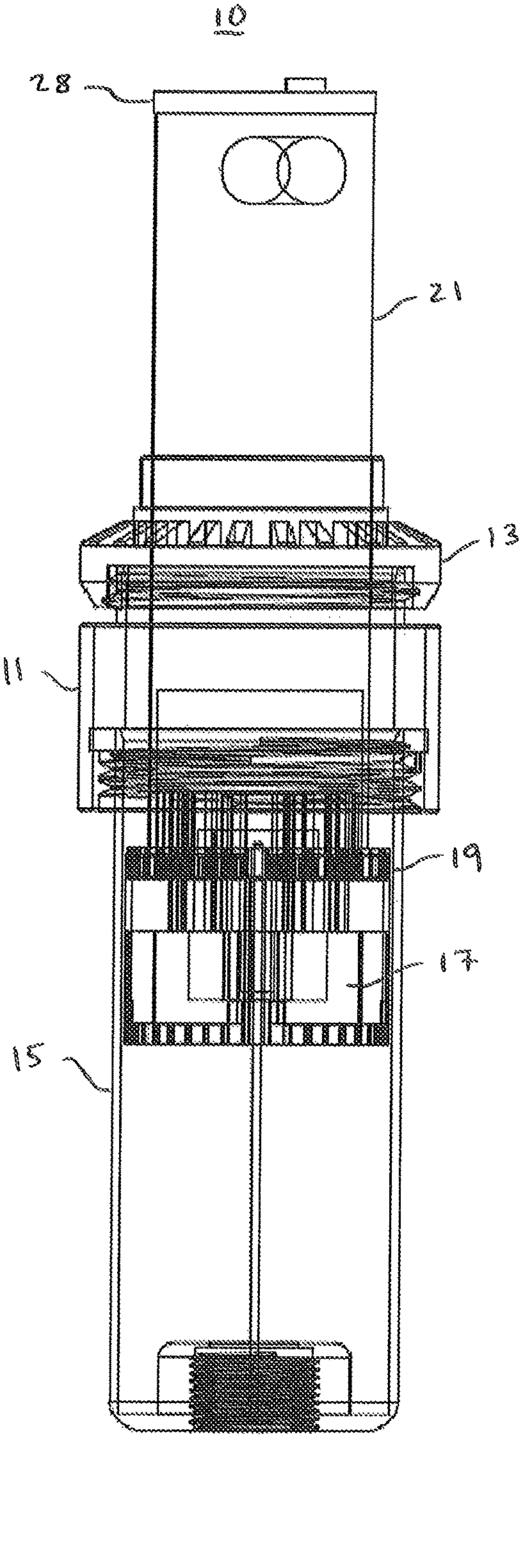
FIG. 4 is a transparent view that shows, in superposition, an external riser extension and internal riser extension of the present invention installed to a conventional rotary sprinkler that is fully expanded.

FIG. 4 provides a transparent view that shows, in superposition, an external riser extension 11 and internal riser extension 17 of the present invention installed to a conventional rotary sprinkler that is fully expanded to an operating position. In this state, the internal riser extension 17 has been forced upward through enclosure 15 by water pressure entering the enclosure from below. The upward force pushes the stem 21 outward beyond cap 13 to the operating position, in which water may be ejected from sprinkling head 28. In the operating position, the external riser extension 11 does not move relative to the enclosure 15. External riser extension 11 is tightly attached between cap 13 and enclosure 15 to extend the overall length of the enclosure, by a length substantially equivalent to the length that the internal riser extension 17 adds to the overall length of stem 21.

Figure 5:
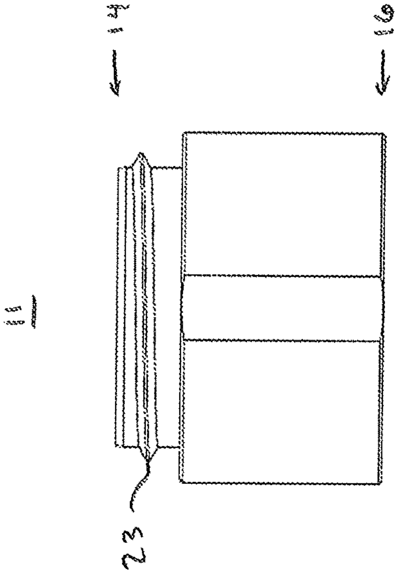
FIG. 5 is a side view of one embodiment of an external riser extension according to the present invention.

FIG. 5 shows one embodiment according to the invention of an external riser extension 11 for the rotary sprinkler riser extension kit. Preferably, the external riser extension 11 is formed as a singular component, for example, by an injection molding process using ABS or acetal plastic. In other embodiments, the external riser extension 11 may be formed by machining, forging, or three-dimensional printing, from any generally rigid material among many suitable metals and plastics. In one embodiment, the external riser extension 11 has an overall height of about 2.2 in. and an outer maximum diameter of about 2.8 in.

A channel 12 extends centrally through the upper end 14 and lower end 16 of the external riser extension 11. The channel 12 may be vertical and cylindrical, and concentrically aligned with a rotational axis 18 of the external riser extension 11. The cylindrical channel 12 may have a height substantially equal to the length of the internal riser extension 17, and an inner diameter sized, as desired, to accommodate the stem 21 and other internal components, such as a spring, of a conventional rotary sprinkler. The lower end

16 of the external riser extension 11 is configured to attach to the enclosure 15 of the rotary sprinkler. In one embodiment, the external riser extension 11 comprises a cylindrical length of pipe which may be threaded at both ends. For example, the external riser extension 11 may be configured with male threading 23 at its upper end configured to engage female threading of the cap 13 of the rotary sprinkler, and with female threading 25 at its lower end configured to engage an upper end of the enclosure 15 of the rotary sprinkler.

Figure 6:
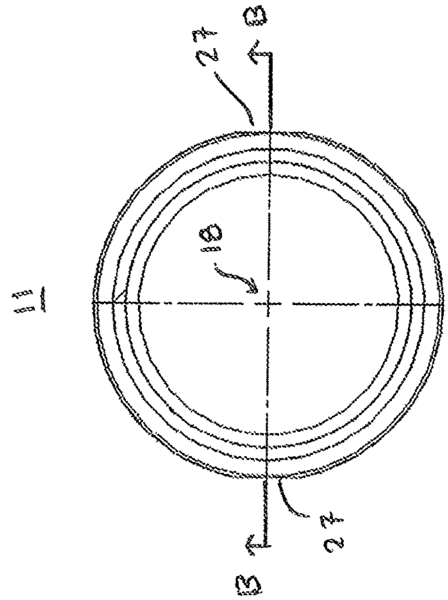
FIG. 6 is a top view of the external riser extension of FIG. 5.

FIG. 6 shows a top view of the external riser extension 11. This view illustrates the central location of rotational axis 18, which is denoted by the + sign. External riser extension 11 may also be configured with one or more flattened or planar surfaces 27 on its perimeter, to facilitate engaging and disengaging the riser extension from cap 13 or from enclosure 15 by hand or by tool.

Figure 7:
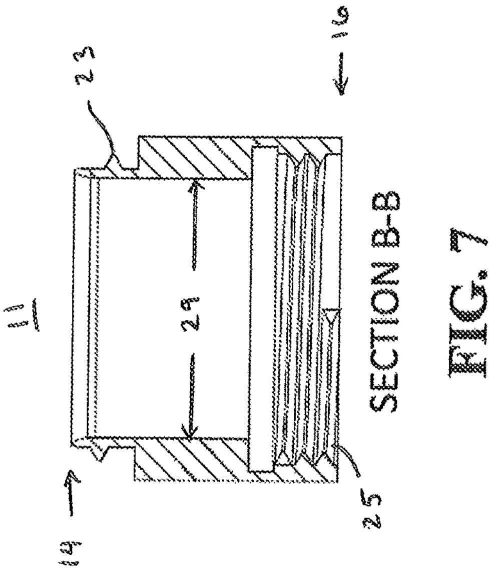
FIG. 7 is cross-sectional side view of the external riser extension taken along section B-B of FIG. 6.
Figure 8:
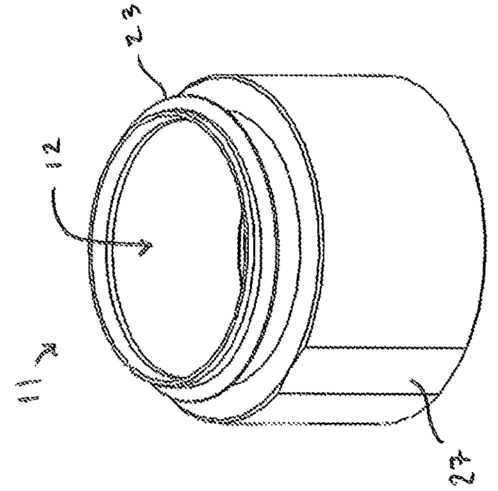
FIG. 8 is a perspective view of the external riser extension of FIG. 5.

FIG. 7 shows a cross-sectional side view of the external riser extension 11 taken along section B-B of FIG. 6. The internal width or diameter 29 of channel 12 is preferably sized to match the internal diameter of the enclosure 15. Threads 23 and 25 are configured to provide a water-tight seal when engaged, respectively, to cap 13 and enclosure 15 and when tightened by hand. FIG. 8 shows a perspective view of the external riser extension 11.

Figure 9:
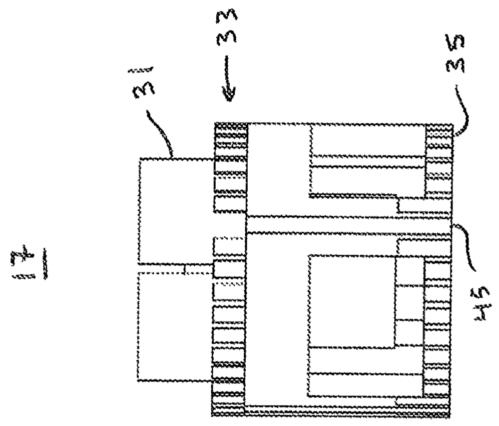
FIG. 9 is a side view of one embodiment of an internal riser extension according to the present invention.

FIG. 9 is a side view of one embodiment of an internal riser extension 17 for a rotary sprinkler riser extension kit according to the present invention. Preferably, the internal riser extension 17 is formed as a singular component, for example, by an injection molding process using ABS or acetal plastic. It may however comprise additional parts, such as a filtration mesh (not shown) used to prevent dirt and debris while passing irrigation water. The internal riser extension 17 includes an upper channel 31, gear engagement tabs 33, and a lower gear 35. In a preferred embodiment, each of the foregoing components is arranged concentrically with respect to one another, and with respect to rotational axis 18 when the internal riser extension 17 is installed to a conventional rotary pop-up sprinkler, as depicted in FIGS. 1-2. The upper channel 31 is configured to direct water upward against stem 21. The gear engagement tabs 33 are configured to interleave with and friction-fit to complimentary gear teeth of the geared bottom end 19 of stem 21, to maintain the internal riser extension 17 in cooperative rotational engagement therewith. Each gear engagement tab 33 may comprise a vertical rectangular tooth extending in a direction parallel to a central rotational axis 38. When the kit is properly installed to a conventional sprinkler as shown in FIGS. 1-2, rotational axes 18 and 38 coincide.

Each gear engagement tab 33 may be separated from an adjacent gear engagement tab by a width substantially equal to the width of a tooth on the geared bottom end 19 of stem 21. The gear engagement tabs 33 are preferably arranged circumferentially about a perimeter of the internal riser extension 17. Lower gear 35 is configured similarly to the geared bottom end 19, to transmit rotational motion to stem 21 in response to a rotary actuation means. That is, when a kit according to the invention is installed on a rotary pop-up sprinkler, lower gear 35 performs the same function as the geared bottom end 19 performs when the kit is not installed.

Figure 10:
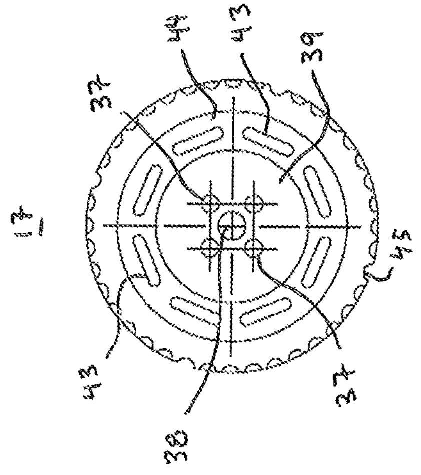
FIG. 10 is a bottom view of the internal riser extension of FIG. 9.

FIG. 10 shows a bottom view of the internal riser extension 17. In one embodiment, water may be directed upward toward the upper channel 31 through one or more through-holes 37 and/or central through-hole 41, each of which is defined through a lower plug 39. Lower plug 39 extends downward from a lower baffle 44, which is located approximately midway along the length of the internal riser extension 17. The lower baffle 44 has a larger diameter than lower plug 39. A plurality of additional through-holes 43 may be defined through the lower baffle 44 at a radius greater than that of the lower plug 39, to provide additional flow channels to direct water to the upper channel 31. Through-holes 37 or 43, or both sets of through-holes 37 and 43, may be arranged concentrically with respect to the rotational axis 38, and spaced apart evenly. When the kit is properly installed to a conventional sprinkler as shown in FIGS. 1-2, through-holes 37, 41 and 43 are in fluid communication with a flow channel extending vertically through the stem 21 to the sprinkler head 28.

Figure 11:
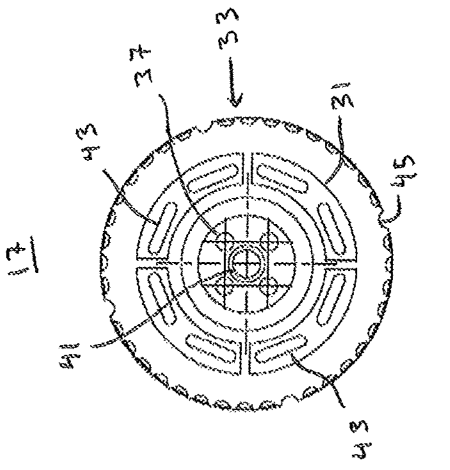
FIG. 11 is a top view of the internal riser extension of FIG. 9.

FIG. 11 shows a top view of the internal riser extension 17. This view illustrates the arrangement of through-holes 37, 41 and 43 on a top surface of upper channel 31 in similar configuration as their arrangement on the bottom surface of lower plug 39 and lower baffle 44.

Figure 12:
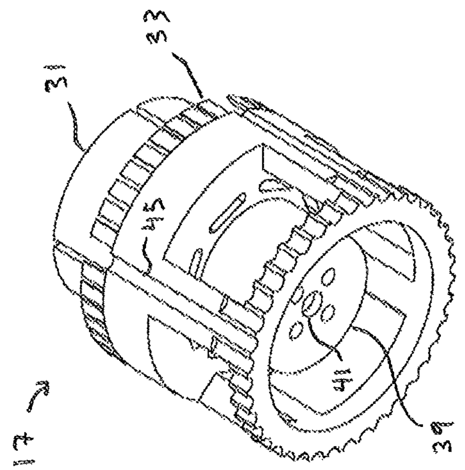
FIG. 12 is a lower perspective view of the internal riser extension of FIG. 9.
Figure 13:
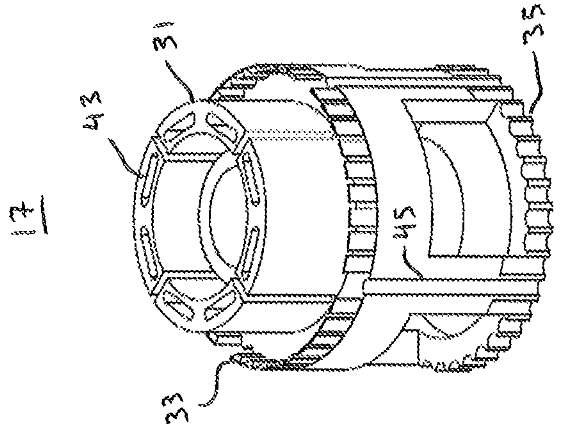
FIG. 13 is an upper perspective view of the internal riser extension of FIG. 9.

FIG. 12 shows a lower perspective view of the internal riser extension 17. One or more longitudinal grooves 45 may be formed on the outer surface of the internal riser extension 17 to align the internal riser extension within the enclosure 15 during assembly. Grooves 45 may be configured to engage rails formed vertically along the inner wall of the enclosure 15, e.g., to limit rotation of the rotary sprinkler. During operation, when the rotary sprinkler riser extension kit of the invention is installed in a rotary pop-up sprinkler, water pressure impacting the bottom surface of lower plug 39 pushes the internal riser extension upward to fully expand the pop-up sprinkler into active position. This allows water flow to be directed to the through-holes 37, 41, and 43, and through the upper channel 31 and into stem 21, and through the head 28. Simultaneously, the existing means for rotating the rotational pop-up sprinkler causes the lower gear 35 to rotate, which thereby causes the geared bottom end 19 also to rotate, due to engagement of the gear engagement tabs 33 thereto, to allow the sprinkler to operate as designed. When water pressure is removed from the sprinkler, internal riser extension 17 falls down to its lowest position with the enclosure 15, i.e., to the fully collapsed position. This causes the bottom surface of lower plug 39 to seat against the water inlet port at the lower end of enclosure 15, sealing it off from all through-holes except for the central through-hole 41. In one embodiment, a gasket or plug (not shown) may be installed by friction-fit against central through-hole 41 to provide a check valve to prevent backflow when the sprinkler is in the fully collapsed position. This is especially advantageous in sprinkling systems where additional sprinklers are connected to the same irrigation line at higher elevations, to prevent air pressure from pushing water through sprinklers at lower elevations when the water supply is shut off. FIG. 13 shows an upper perspective view of the internal riser extension 17, to facilitate an understanding of the configuration of the present invention.

In other embodiments, the internal riser extension 17 or portions thereof may be formed by machining, forging, or three-dimensional printing, from any generally rigid material among many suitable metals and plastics. In one embodiment, the internal riser extension 17 is generally cylindrical, and is sized to fit within the enclosure 15 of the rotary sprinkler and attach to the bottom of the stem 21. The internal riser extension 17 has a height substantially identical to the height of the external riser extension 11. Thus, when the internal riser extension 17 is attached to the stem of the conventional rotary sprinkler, it raises the sprinkler head 28 by an amount equal to the height that the external riser extension 11 adds to the height of the enclosure 15, to ensure proper fit. The end result is a rise in the overall height of the rotary sprinkler, with no leakage.

In view of the foregoing, the skilled artisan will appreciate that in still other embodiments of the invention, an internal riser extension 17 comprises a body, preferably generally cylindrical, that defines a channel running centrally through its upper end and lower end and concentrically aligned with a rotational axis of a conventional rotary sprinkler to which it is attached. The internal riser extension 17 includes a means for attaching to the bottom of the rotary sprinkler stem 21, a lower gear 35 attached to its lower end, and a means for arresting rotation of the sprinkler head, e.g. channels 45, which may comprise four channels spaced 90 degrees apart. The body of the internal riser extension 17 has an external width or diameter less than the inner width or diameter of the enclosure 15 of the rotary pop-up sprinkler, so that the internal riser extension can fit within the enclosure without causing undue interference during sprinkler operation.

In a more elaborate embodiment of the invention, an internal riser extension may include means for attaching to the bottom of a rotary pop-up sprinkler, which means may include gear engagement tabs having outer grippers, inner grippers, or both outer grippers and inner grippers. The outer grippers may be configured to attach to and engage the rotary gear of the rotary pop-up sprinkler, or may latch around the top rim of the rotary gear of the rotary sprinkler, e.g. by snap-fit. The inner grippers may be configured to attach to an interior part of the stem of the rotary pop-up sprinkler. In one embodiment, the inner grippers comprise hooks that snap-fit to fins within the stem of the rotary sprinkler that are designed to arrest rotation of the sprinkler head. That is, the gear engagement tabs may include a plurality of inwardly angled flexible claws for facilitating removable attachment of the internal riser extension 17 to the geared bottom end 19 of any of various conventional popup rotary sprinkler heads. The flexible claws are preferably spaced evenly about the circumference of the upper end of internal riser extension 17. Each flexible claw may be angled slightly inward. The dimensions of the flexible claw may be chosen to form a durable and resilient spring so that the flexible claw will flex and straighten outward in response to pressure of the claw against the perimeter of the rotary gear, and then snap inward when the finger portion of the flexible claw is forced past the rim of the gear. In this manner, each flexible claw may attach tightly to the stem of a rotary sprinkler, gripping the gear portion. Similarly, the inner grippers would comprise flexible hooks or claws.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A riser extension kit configured for installation on a rotary sprinkler that is operational without such kit installed, the rotary sprinkler having a an enclosure having (i) an outlet end and an inlet end, (ii) a rotatable stem installed within the enclosure and having a geared end, and (iii) a cap having means for removable attachment to the outlet end of the enclosure, the stem configured to direct fluid entering the inlet end to flow through the stem and the cap and to exit the outlet end, the riser extension kit comprising:

an external riser extension attachable between the cap and the outlet end of the enclosure, the external riser extension defining a channel configured to allow passage of the stem through the external riser extension; and an internal riser extension having a lower end configured to arrest rotation of the rotary sprinkler and an upper end configured to engage the geared end of the stem, a baffle formed at an intermediate position between the lower end and the upper end, a plug extending from the baffle toward the lower end, and at least one through-hole defined through the plug, the at least one through-hole fluidically connecting the inlet end to an interior flow channel extending through the stem.

2. The riser extension kit of claim 1, wherein the upper end of the internal riser extension comprises a plurality of gear engagement tabs.

3. The riser extension kit of claim 2, wherein the plurality of gear engagement tabs are configured to interleave with complimentary gear teeth forming the geared end of the stem of the rotary sprinkler.

4. The riser extension kit of claim 2, wherein the plurality of gear engagement tabs are configured to friction-fit to complimentary gear teeth formed about the geared end of the stem of the rotary sprinkler.

5. The riser extension kit of claim 2, wherein the plurality of gear engagement tabs are configured to maintain the internal riser extension in cooperative rotational engagement with the stem of the rotary sprinkler.

6. The riser extension kit of claim 2, wherein each gear engagement tab comprises a rectangular tooth extending in a direction parallel to a central rotational axis of the external riser extension.

7. The riser extension kit of claim 6, wherein an empty space formed between any two adjacent rectangular teeth is substantially equal to a width of a gear tooth forming the geared end of the stem.

8. The riser extension kit of claim 1, wherein the internal riser extension is configured to concentrically align with a rotational axis defined by the stem within the enclosure.

9. The riser extension kit of claim 1, further comprising a plurality of through-holes defined through the plug.

10. The riser extension kit of claim 9, wherein at least one of the plurality of through-holes is defined through a center point of the plug.

11. The riser extension kit of claim 10, wherein a remainder of the plurality of through-holes are symmetrically disposed about the central through-hole.

12. The riser extension kit of claim 10, wherein each of the plurality of through-holes opens into a common upper flow channel.

13. The riser extension kit of claim 12, the baffle defining at least one secondary through-hole formed outside the plug.

14. The riser extension kit of claim 13, further comprising a plurality of secondary through-holes defined through the baffle.

15. The riser extension kit of claim 14, wherein each of the secondary through-holes opens into the common upper flow channel.

16. The riser extension kit of claim 15, wherein the common upper flow channel is in fluid communication with the interior flow channel of the stem.

17. An internal riser extension for a riser extension kit configured for installation on a rotary sprinkler that is operational without such kit installed, the internal riser extension comprising:

a lower gear configured to arrest rotation of the rotary sprinkler;

an upper end having a means for removable attachment to a lower end of a stem of the rotary sprinkler;

a baffle connecting the lower gear to the upper end;

a plug extending from the baffle toward the lower end; and at least one through-hole defined through the plug and opening into a common flow channel, the common flow channel in fluid communication with the stem.

18. The internal riser extension of claim 17, further comprising at least one longitudinally extending groove defined in an outer surface of the internal riser extension, wherein the at least one longitudinally extending groove is configured to engage a vertical rail formed on an inner surface of the enclosure.

19. The internal riser extension of claim 17, further comprising at least one secondary through-hole defined through the baffle and outside the plug, wherein the at least one secondary through-hole opens into the common flow channel.

20. The internal riser extension of claim 19, comprising a plurality of through-holes defined through the plug and a plurality of secondary through-holes defined through the baffle and outside the plug.

* * * * *